Sept. 17, 1935.  P. R. SIMMONS  2,014,595
TOASTING MACHINE
Filed Feb. 15, 1932  4 Sheets-Sheet 1

INVENTOR.
PAUL R. SIMMONS.
BY
Lockwood Lockwood Goldsmith & Galt
ATTORNEYS.

Sept. 17, 1935.   P. R. SIMMONS   2,014,595
TOASTING MACHINE
Filed Feb. 15, 1932   4 Sheets-Sheet 2
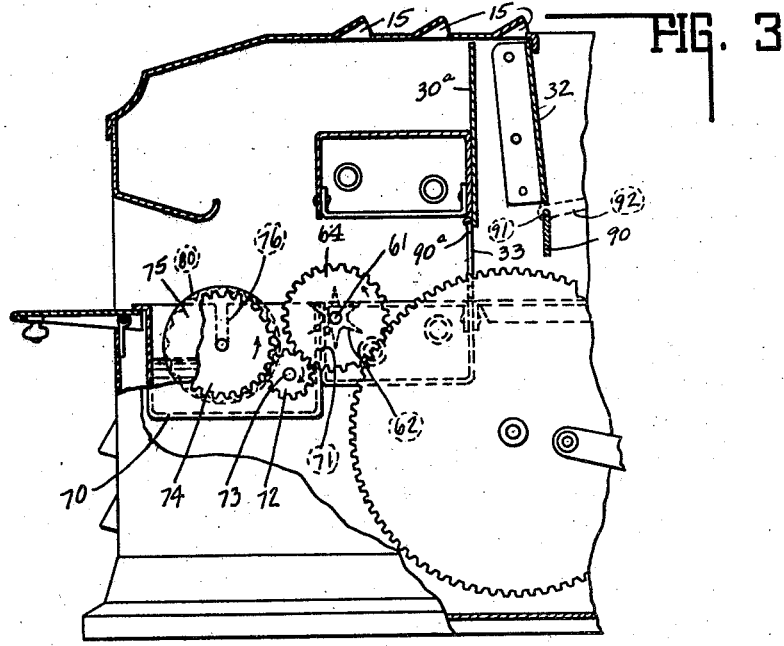
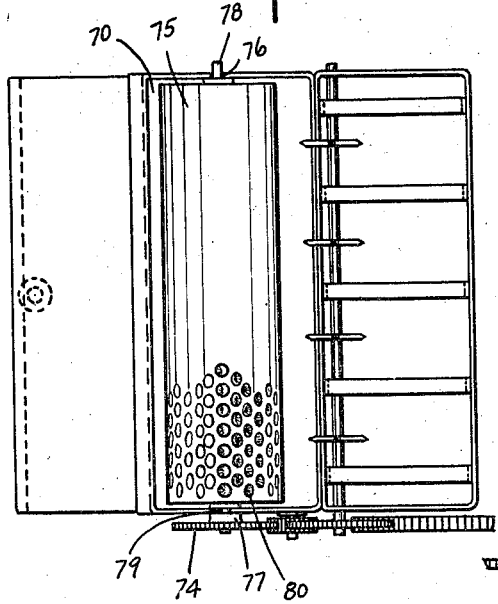
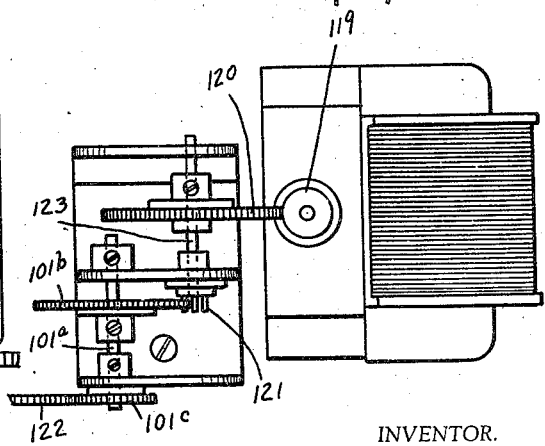
INVENTOR.
PAUL R. SIMMONS.
BY
Lockwood Lockwood Goldsmith & Galt
ATTORNEYS.

Sept. 17, 1935.   P. R. SIMMONS   2,014,595
TOASTING MACHINE
Filed Feb. 15, 1932   4 Sheets-Sheet 3
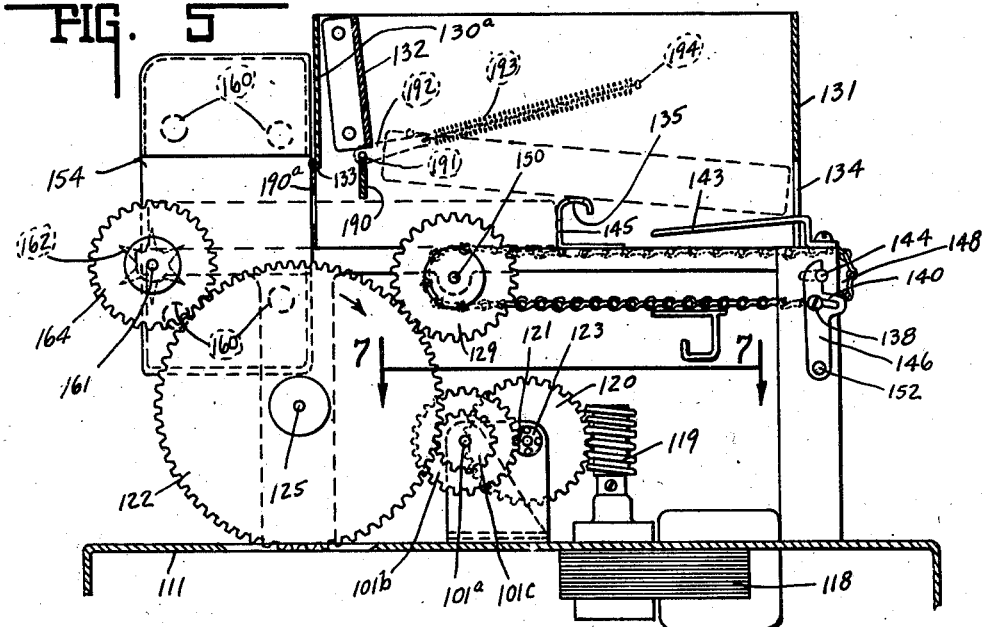
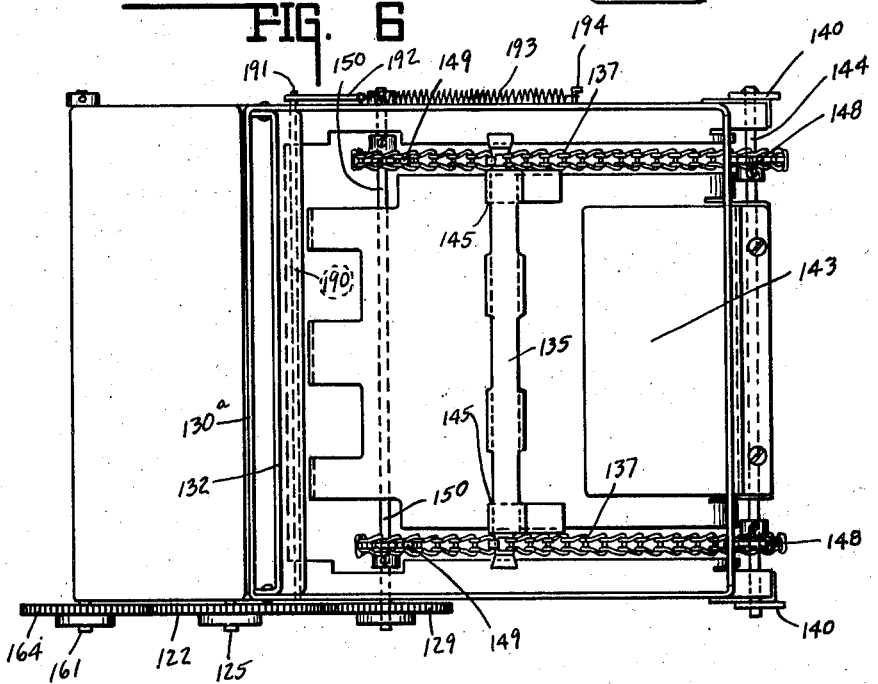
INVENTOR.
PAUL R. SIMMONS.
BY
Lockwood Lockwood Goldsmith & Gell
ATTORNEYS.

Sept. 17, 1935.  P. R. SIMMONS  2,014,595
TOASTING MACHINE
Filed Feb. 15, 1932  4 Sheets-Sheet 4
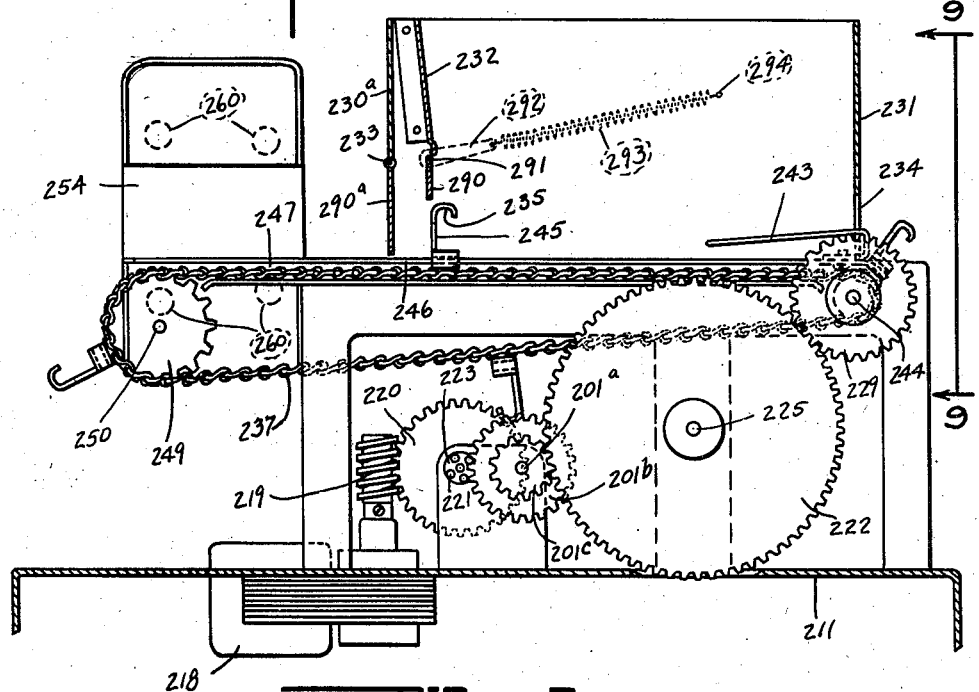
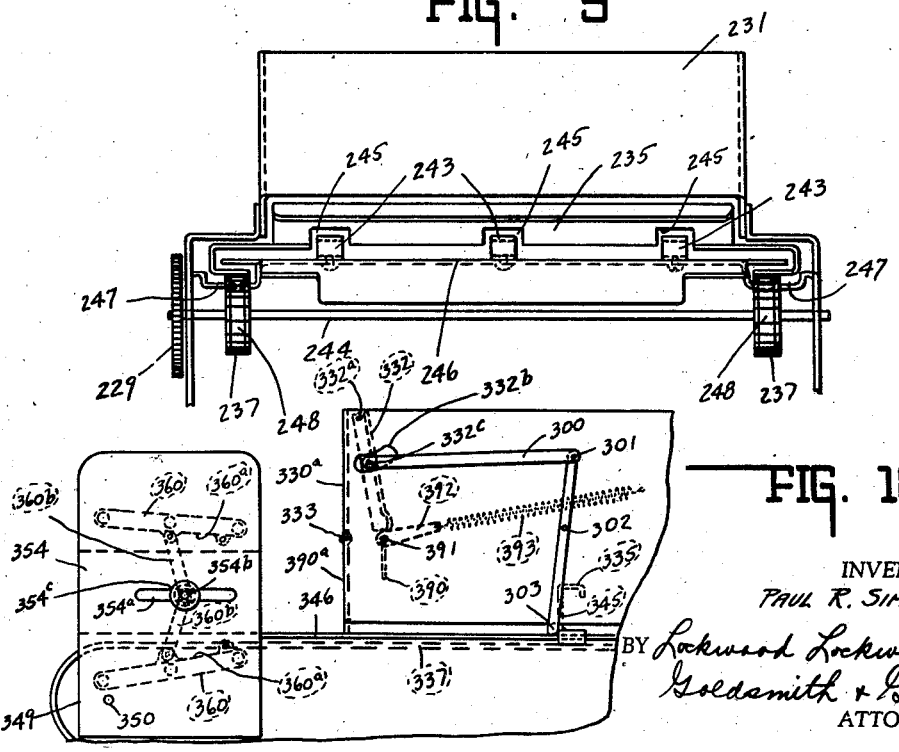
INVENTOR.
PAUL R. SIMMONS.
BY Lockwood Lockwood
Goldsmith & Galt
ATTORNEYS.

Patented Sept. 17, 1935

2,014,595

UNITED STATES PATENT OFFICE 2,014,595

TOASTING MACHINE

Paul R. Simmons, Marion, Ind., assignor to Rutenber Electric Co., Marion, Ind., a corporation Application February 15, 1932, Serial No. 592,999

10 Claims. (Cl. 53—5)

This invention relates to a toaster of the electrical heater type.

This toaster, as illustrated, has a capacity of anywhere from one to six or more slices of bread.

The chief object of this invention is to toast bread by an initial drying operation and follow the same by final toasting the surface thereof to form toast, said toast being formed by passing the bread slices through a compartment, heat being applied simultaneously to opposite sides of the slices, and to a greater degree initially for quick drying and then followed by a lesser degree thereafter for toasting.

Another object of the invention consists in preventing excessive drying of successive bread slices prior to toasting thereof.

One form of the invention is illustrated as of the reciprocatory type.

Another form of the invention is illustrated as of the same type, with the addition of an automatic buttering device, while a third form of the invention is illustrated as of the continuous toasting type.

The common subject matter consists of magazine and toasting compartments separated by a heat venting passage and associated movable mechanism for transferring a single slice from the magazine to the toasting compartment for toasting and the discharge of toast therefrom together with an arrangement for accommodating slices of different thicknesses.

The full nature of the invention will be understood from the accompanying drawings and the following description and claims:—

Fig. 3 is a side elevation of a modified form of toaster, parts being broken away to show other parts in elevation and other parts in longitudinal section.

Fig. 4 is a top plan view of a portion of the parts shown in Fig. 3, the housing and cover being omitted.

Fig. 5 is a view similar to Fig. 1 and of a modified form of the invention, the cover and housing being omitted.

Fig. 6 is a top plan view of the modification shown in Fig. 5, with the cover and housing removed.

Fig. 7 is a top plan view of the power mechanism and is taken approximately in the plane 7—7 of Fig. 5.

Fig. 8 is a sectional view of a further modified form of the invention with the cover and housing omitted and is similar to Figs. 1, 3 and 5.

Fig. 9 is an end elevational view of a portion of the mechanism shown in Fig. 8 and is taken on line 9—9 of Fig. 8 and in the direction of the arrows.

Fig. 10 is a side elevation of a portion of a further modified form of the invention, the casing being removed.

Figure 1:
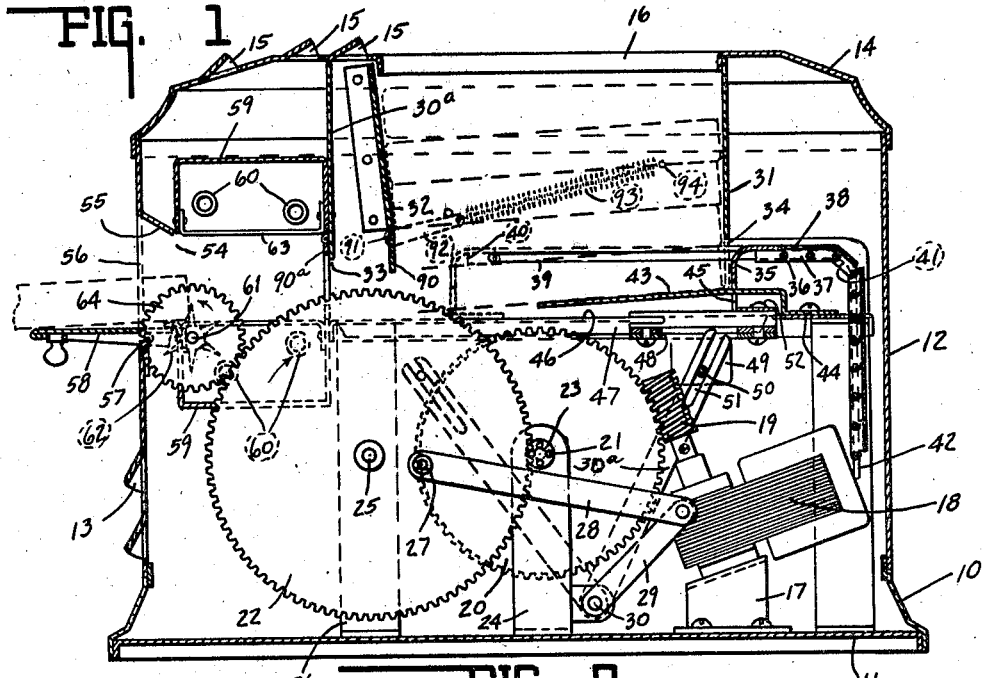
Fig. 1 is a longitudinal sectional view through the toaster, but it is not taken in a single plane.
Figure 2:
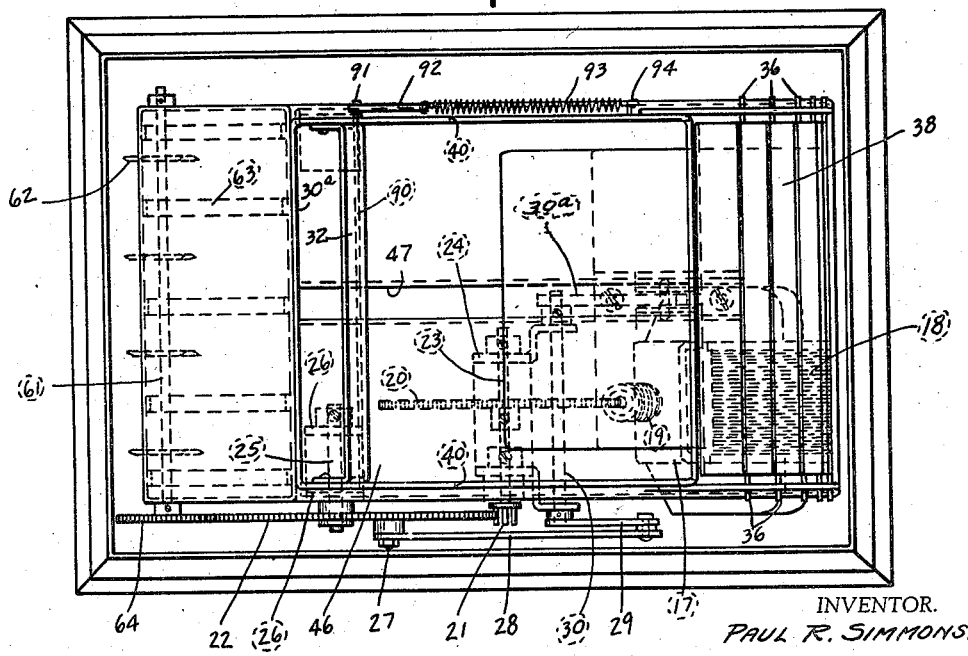
Fig. 2 is a top plan view of the toaster with the housing and cover removed.

In Figs. 1 and 2 of the drawings 10 indicates the base and suitably secured thereto is a bottom member 11 to which is secured a main frame structure supporting the motive power, the bread slice supporting and advancing mechanism, the toasting mechanism and the toast discharge mechanism. Telescopically associated with the base and suitably secured thereto is a housing 12 which is suitably louvered at 13. A cover 14, is mounted upon the upper end of the housing and is louvered at 15. The cover includes a central opening defined by a downwardly directed peripheral flange 16 and the same is of such size and outline that it will accommodate the largest size bread slice.

In the lower right hand portion of the housing, there is mounted at 17 an electric motor 18, the rotor of which is directly connected to worm 19 which drives a worm wheel 20. Worm wheel 20 through the pin type pinion 21 drives the gear 22. Worm wheel 20 and pinion 21 are suitably secured to shaft 23, rotatably supported in the brackets 24. Gear 22 is rotatably supported by shaft 25 mounted in brackets 26. Gear 22 includes an eccentric pin 27 which pivotally supports a link 28, in turn pivotally connected to one arm 29 of a bell crank lever, pivotally supported at 30. The other arm 30ª of the lever is centrally positioned, see Fig. 2, in longitudinal alignment with the center of the machine. The arms 31 and 29—see Fig. 2—are positioned at opposite ends of the rock shaft 30.

A substantially square or rectangular tubular magazine 31 is suitably supported by the members 10, 11 and 14 and the flange defined opening 16 communicates therewith. An inclined guide 32 is rearwardly directed with reference to the magazine discharge outlet 33. Opposite the discharge outlet 33 is an opening 34 and an angularly sectional slice pusher member 35 is adapted to reciprocate to and fro through the opening or port 34. The pusher 35 is pivotally connected, in the present form of the invention, at 36 to a link structure 37 secured to a platform forming slat 38. The magazine 31 at opposite sides includes a substantially horizontal slot 39, terminating at 40. The pivotal connection 36 is herein illustrated as an elongated rod that extends into and projects on beyond the slot 39 terminating at 40 for its forward end. The slot 39 at its rearward end is curved as at 41 and is extended downwardly as at 42. A plurality of linkages and platform forming members 37 and 38 with their connecting pintles 36 are provided, said pintles also extending into and projecting beyond the L-shaped slots set forth.

Pivotally mounted below guide 32 adjacent outlet 33 is a tiltable restraining guide plate or bar 90, one trunnion 91 mounting a lever arm 92 connected to a tension spring 93 anchored at 94. This bar or plate not only acts as a guide but also as a bar or stop to the forward movement of the second lowest slice into the toasting compartment. If the lowest slice is thicker than usual, the plate will be tilted by the slice and it is permitted to pass under the tilted bar into the toasting compartment. When the thick slice has passed beyond the bar, it is returned to its normal position by spring 93.

It will be apparent that when the member 35 is projected through the opening 34 in the magazine toward the shutter 90, the substantially vertical face of said transferring ejector will engage the rear edge of the lowermost bread slice and force the same forwardly through the opening 33 into the toasting compartment for toasting. At the same time the platform members 38 follow the member 35 and support the second lowest slice and all the superposed slices during the transferring interval. The wall 30ᵃ forms the opening 33. Pivotally mounted in the opening is a second shutter 90ᵃ similarly provided to permit the passage of an extra thick slice of bread therebeneath.

The shutters 90ᵃ and 90 serve to retain heat in the toasting compartment and restrain the passage of heat into the storage compartment.

The walls 30ᵃ and 32 form a flue or chamber which is vented at 15, thereby insuring substantially uniform coolness in the slice compartment. This prevents excessive drying of superposed slices therein and subsequent scorching or burning of these slices later in the toasting compartment.

After the lowermost slice has been pushed forwardly into the toasting compartment, the slice is suitably removed from the same as by the star wheel 62 and the transfer mechanism is retracted, which, when the member 35 returns to its full line position, as shown in Fig. 1, permits the previously platform supported lowermost slice to descend in the magazine the depth of approximately one slice.

To facilitate the transfer of slices from the magazine to the toasting compartment and to support the slices in the magazine and to protect the power mechanism from the crumbs, an inclined stationary guide is provided; the same being inclined downwardly and extending forwardly in the magazine and indicated by the numeral 43. Said inclined platform guide is suitably anchored as at 44. The member 35 is suitably slotted as at 45 to permit platform 43 to extend therethrough to provide clearance for the platform in the movement of the member 35 from the full line position shown in Fig. 1 to the dotted line or ejecting position shown in the same figure.

The bottom of the magazine chamber is closed by the members 46 which are spaced apart forming a slot 47. Straddling the slot 47 and mounted therein, is a cross head construction, indicated generally by the numeral 48, which has a pair of depending ears 49 that include a transverse connecting pin 50. Pin 50 rides in longitudinal slot 51 of the arm 31 of the bell crank construction. Thus, the cross head is reciprocated to and fro by the pin in the slot 47 and in the rotation of the gear 22 through the mechanism previously described. The transfer and ejecting member 35 is suitably secured at 52 to the cross head for movement therewith. Platform 43—see Fig. 1—protects the cross head mechanism and motor from crumbs descending into the same.

Suitably supported near the forward end of the toaster is a heating compartment which has its inlet corresponding with the magazine outlet 33 and the discharge 54. The housing 12 includes the portion 55 that registers therewith and pivotally supported adjacent the opening 56 at 57 is a door 58 which, when opened, forms a platform extension for toast discharge.

Mounted within the toasting compartment formed by the members 59 and suitably supported by the base and forming a clear passage therebetween and in alignment with the openings 56, 54, 53 and 33, are the upper and lower heating structures. Each heating structure includes a plurality of heating elements, indicated generally by the numeral 60. These heating elements are positioned closest to the passage at the inlet end of the passage and preferably are positioned farthest from the passage or at a greater distance apart near the outlet end of the passage. The purpose of this toasting is to insure relatively quick drying of the bread slice in the initial passage of the slice portion to be toasted through the toasting passage and then the finishing operation, or final toasting, is obtained by the more remotely spaced heating units. Suitable switch means not shown, may control the heating units and usually a single source of electrical energy controlled by a single switch supplies the heating units 60 with energy and the motor 18 with energy.

It will be apparent from Fig. 1 and the dotted line position of the member 35, that after the bread slice has been pushed forwardly so that its rear edge corresponds to the dotted line position of the element 35, no further movement can be expected from this transferring mechanism, and inasmuch as the slices are superposed and the transfer mechanism has not moved completely across to close the shutoff at the bottom of the magazine, additional means must be provided for positively removing the slice through the toasting chamber and passage. Said means is herein illustrated as a shaft 61 which mounts in spaced relation a plurality of pointed star wheels 62 and these star wheels are interposed between the slice supporting bars 63 that extend across the toasting chamber from inlet to outlet. The shaft 61 upon its free end mounts the pinion 64 which meshes with gear wheel 22.

In Figs. 3 and 4 of the drawings, there is illustrated a modified form of the invention and in said figures, the same parts, or similar parts, are indicated by identical reference numerals. The additional structure disclosed in this modification consists of a buttering device and the same is incorporated within the housing structure which is made sufficiently long to accommodate the same. The buttering device includes a chamber 70 which has one wall suitably slotted at 71 for clearance of the starwheel toast ejecting star wheels 62 carried by shaft 61. The gear 64, in this instance, meshes with a pinion 72 supported upon a stub shaft 73 and said pinion meshes with a gear 74 rigid with a butter transferring cylinder 75. Opposite side walls of the chamber 70 are slotted as at 76, forming open bearings for the cylinder supporting shaft 77. The portions of the shaft receivable by the slots are the reduced end 78 at one end and the annular recessed portion 79 at the other end of said shaft 77, which mounts the gear 74. The buttering cylinder is provided with a plurality of conical depressions 80. The cylinder when rotating in the chamber 70 carries upwardly in each depression a small globule of melted butter due to capillary attraction. The toast, being absorbent upon engaging the cylinder of the buttering device, absorbs the butter and thus one side of the toast slice is automatically buttered. The heat from the toasting mechanism, by reason of positioning of the compartment 70 adjacent the toasting compartment, insures that the butter will be in a liquid condition. The butter compartment may be readily cleaned by removing the buttering cylinder 70.

In Figs. 5 to 7 of the drawings, there is illustrated a modified form of the invention and in said figures the same parts, or similar parts, are indicated by reference numerals similar to those employed in Figs. 1 and 2 and increased by 100.

The modification shown consists of an endless articulated transfer device of the endless belt type and it is to be understood that this structure may be embodied in the form of the invention shown in Figs. 3 and 4 without departing from the scope thereof.

In the drawings, the support platform is indicated by the numeral 143, the forward inclined hopper forming member by the numeral 132, the discharge outlet of the magazine by the numeral 133, and the tiltably mounted gate structure by the numeral 190. Adjacent thereto is the heating compartment with the heating elements 160 positioned as previously described, and the inlet of the compartment is indicated by the numeral 130 and the outlet by the numeral 154. The usual star wheel mechanism 162 is mounted on shaft 161 which, in turn, mounts gear 164 that meshes with the gear 122, in turn driven by the pin pinion 121 mounted on shaft 123 which supports the worm wheel 120 meshing with the worm 119 of the motor 118. Herein there is interposed between gear 122 and the driving pinion 121, a reduction gear construction, indicated generally by the numeral 101ª, 101ᵇ and 101ᶜ.

The venting flue or chamber arrangement is formed between members 130ª and 132 while the slice accommodating feature is provided by member 190 and 190ª.

In this form of the invention, the member 135 is slotted at 145 to straddle the member 143 in the passage of the member 135 from the right to the left, as shown in Fig. 5. The member 135 is connected at the sides to the articulated chain construction including links 137, and herein a pair of chains is provided which are in spaced relation and at opposite sides of the magazine. A shaft 150 mounts the sprockets 149 that engage the chains 137 and thus the chains are rotated. The idler sprockets 148 are mounted at the rear end of the device on a shaft 144. Associated with shaft 144 at opposite ends are suitable tension or tightening means in the form of a pivotally supported bearing member 146 pivotally supported at 152 and adjustably secured by means of the set screw 138 mounted in the slot 140.

The shaft 150 terminates in a gear 129 that meshes with the gear 122 mounted on shaft 125. The operation of the device is as follows:—The slices are positioned in superposed relation in the magazine. The motor is energized and the heating elements are energized. The conveyer mechanism then proceeds and the first of the two conveyor members 135 engages the lowermost slice bearing on the platform 143 and forces the slice from the right to the left and out through the discharge opening of the magazine and into the toasting compartment. The transfer device 135 then moves downwardly and rearwardly. To insure continuous and progressive movement of the slices to be toasted, a plurality of transfer devices are mounted upon the chains. The star wheel conveyor 162 causes slice movement through the heating compartment and slice discharge therefrom.

In Figs. 8 and 9 a modified form of the invention is illustrated. In this form like or similar parts bear numerals of the 200 series. In this form of the invention the endless chain conveyor extends completely through the machine longitudinally while the power mechanism therefor is positioned slightly different from the previous forms so that greater compactness can be obtained. In this form four slice engaging members are provided.

In Fig. 10 there is illustrated a modified form of the device. Herein similar numerals of the three hundred series indicate like or similar parts. To insure successful operation or feeding of fresh (three hour) bread slices, an agitator arrangement is provided. Wall 332 is shown pivotally supported at 332ª and is tilted counterclockwise to engage the bread slices as the conveyor 337 moves forwardly. In this movement carrier member 345 engages depending arm 303 of a lever pivoted at 302 and connected at 301 to link 300 connected to the wall 332 at 332ᶜ. The connection 332ᶜ passes through the slot 332ᵇ, so that this mechanism is external of the magazine and opposite from the mechanism 390, 391, 392 and 393, also illustrated herein.

To make a universal toaster produce the desired toast, an adjustable arrangement is provided for the heating elements 360. These elements are supported at 360ª, in turn supported by lever arms 360ᵇ connected to a pin or shaft 354ᵇ riding in a slot 354ª of the side wall of the toasting passage having the discharge 354. A clamp nut 354ᶜ secures the shaft 354ᵇ in adjusted position. The heating units 360, by reason of the adjusting toggle arrangement, are caused to move toward or away from each other, depending upon the voltage employed, as well as the amount of toasting desired. The upper lever 360ᵇ is longer than the lower one so that the top heating unit 360 moves more than the bottom unit for adjustment.

The invention claimed is:—

1. In a toaster, the combination of a magazine arranged to receive a plurality of superposed bread slices, a platform at the bottom of the magazine upon which the slices normally rest, a toasting compartment adjacent the magazine having an inlet and outlet, the inlet communicating with the lower portion of the magazine, the inlet and outlet being arranged for the passage of the slice therethrough, a transfer device mounted above the platform and having a portion arranged to engage the lowermost slice of bread at the edge remote from the toasting compartment inlet for moving the slice from the magazine to the toasting compartment, and a venting flue between the magazine and toasting compartment.

2. In a toaster, the combination of a magazine arranged to receive a plurality of superposed bread slices, a platform at the bottom of the magazine upon which the slices normally rest, a toasting compartment adjacent the magazine having an inlet and outlet, the inlet communicating with the lower portion of the magazine, the inlet and outlet being arranged for the passage of the slices therethrough, a transfer device mounted above the platform and having a portion arranged to engage the lowermost slice of bread at the edge remote from the toasting compartment inlet for moving the slice from the magazine to the toasting compartment, a platform carried by and movable with the transfer device for supporting the superposed slices while the transferred slice is being moved, and a venting flue between the magazine and toasting compartment.

3. In a toaster, the combination of a toasting compartment having an inlet and outlet, means arranged to progressively present to the compartment and pass therethrough successive slices for toasting, and a plurality of heating members positioned in said compartment above and below the path of slice movement, the heating members adjacent the initial portion of the path being positioned closer together upon opposite sides of the path than the heating elements adjacent the discharge end of the path of movement.

4. In a toaster, the combination of a toasting compartment, a plurality of heating means in spaced relation for forming a substantially horizontal toasting passage therebetween, and a progressively movable slice engaging mechanism for insuring positive movement of the slice through the toasting passage, said heating means being arranged so that the heat applying portions adjacent the initial portion of the passage are closer together than the heat applying portions at the discharge end of the passage.

5. In a toaster, the combination of a toasting compartment, heating means therein arranged to simultaneously toast both sides of a slice in the passage of the slice therethrough, a buttering trough immediately adjacent the heating means in the toasting compartment deriving heat solely from the toasting compartment heating means which insures liquid condition of the butter therein, and an indented cylindrical roller having its lower portion rotatable in the butter compartment and projecting above the same and engageable by one face of the slice in the discharge of the slice from the toasting compartment.

6. In a toaster the combination of a magazine arranged to receive a plurality of superposed bread slices, a toasting compartment adjacent thereto and having an inlet and outlet, the inlet communicating with the lower portion of the magazine, the inlet and outlet being arranged for the passage of a slice therethrough, an articulated transfer device having a portion arranged to engage the lowermost slice of bread at its edge remote from the inlet and move the slice from the magazine to the toasting compartment, and a venting flue between the magazine and toasting compartment.

7. In a toaster the combination of a magazine arranged to receive a plurality of bread slices in superposed relation, a toasting compartment adjacent thereto and having an inlet and outlet, the inlet communicating with the lower portion of the magazine, the inlet and outlet being arranged for the passage of a slice therethrough, an articulated transfer device having an upper portion arranged to engage the lowermost slice of bread at its edge remote from the inlet and move while supporting the slice from the magazine to the toasting compartment, and additional slice moving means positioned in the toasting compartment and operating in timed relation with the transfer device for slice movement in the same direction.

8. In a toaster the combination of a magazine arranged to receive a plurality of superposed bread slices, a toasting compartment adjacent thereto and having an inlet and outlet, the inlet communicating with the lower portion of the magazine, the inlet and outlet being arranged for the passage of a slice therethrough, an articulated transfer device having an upper portion arranged to engage the lowermost slice of bread at its edge remote from the inlet and move while supporting the slice from the magazine to the toasting compartment, and additional slice moving means positioned in the toasting compartment and operating in timed relation with the transfer device for slice movement in the same direction, said articulated transfer device being of the endless chain type.

9. In a toaster, the combination of a toasting compartment, heating means therein and in spaced relation to form a toasting passage, a magazine adjacent the compartment, a vented flue therebetween, and slice moving means arranged to transfer the slice from the magazine to the toasting compartment.

10. In a toaster, the combination of a magazine arranged to receive a plurality of superposed bread slices, a toasting compartment adjacent thereto, slice moving means in the bottom of said magazine, the latter having a lateral discharge, one wall of the magazine being tiltably mounted, and means operable by the slice moving means for tilting said tiltable wall in timed relation to the movement of the slice from the magazine.

PAUL R. SIMMONS.